(12) United States Patent
Daehnert et al.

(10) Patent No.: US 12,388,968 B2
(45) Date of Patent: Aug. 12, 2025

(54) LENTICULAR LENS ASSEMBLY FOR MOUNTING ON A DISPLAY SURFACE AND MOUNTING METHOD

(71) Applicant: 3D Global Holding GmbH, Pockau-Lengefeld (DE)

(72) Inventors: Ullrich Daehnert, Pockau-Lengefeld (DE); Juergen Schwarz, Apolda (DE); Johannes Sigwart, Donaueschingen (DE)

(73) Assignee: 3D Global Holding GmbH, Pockau-Lengefeld (DE)

( * ) Notice: Subject to any disclaimer, the term of this patent is extended or adjusted under 35 U.S.C. 154(b) by 0 days.

(21) Appl. No.: 17/943,124

(22) Filed: Sep. 12, 2022

(65) Prior Publication Data

US 2023/0094504 A1 Mar. 30, 2023

Related U.S. Application Data

(63) Continuation of application No. PCT/EP2021/055993, filed on Mar. 10, 2021.

(30) Foreign Application Priority Data

Mar. 13, 2020 (DE) .......................... 102020203286.6

(51) Int. Cl.
*H04N 13/305* (2018.01)
*H04N 13/349* (2018.01)

(52) U.S. Cl.
CPC ......... *H04N 13/305* (2018.05); *H04N 13/349* (2018.05)

(58) Field of Classification Search
CPC ........................... H04N 13/305; H04N 13/349

(Continued)

(56) References Cited

U.S. PATENT DOCUMENTS 7,839,430 B2 11/2010 Hentschke
2002/0159159 A1* 10/2002 Wilson .................... B32B 27/36
359/630

(Continued)

FOREIGN PATENT DOCUMENTS

CN 1821837 A * 8/2006 ........... G02B 3/0031
CN 103529496 B 1/2014

(Continued)

OTHER PUBLICATIONS

European Patent Office as ISA, International Search Report and Written Opinion for App. No. PCT/EP2021/055993, mailed Jun. 17, 2021.

(Continued)

*Primary Examiner* — Behrooz M Senfi
(74) *Attorney, Agent, or Firm* — Miller Johnson

(57) ABSTRACT

The invention relates to a prefabricated lenticular lens assembly (10) for attachment to a display area (100), having:
a lenticular lens layer (14) comprising a first surface (20) having a plurality of curved lens portions (22) and a second surface (18) facing away from the first surface (20);
a cover layer (12) which faces the first surface (20) of the lens layer (14) at least in some regions;
a carrier layer (16) which faces a second surface (18) of the lens layer (14) at least in some regions;
wherein the lenticular lens layer (14), the cover layer (12) and the carrier layer (16) are already at least indirectly connected to each other before the assembly (10) is attached to the display area (100).
The invention further relates to a method for producing a lenticular lens assembly (10).

5 Claims, 2 Drawing Sheets

(58) Field of Classification Search
USPC .......................................................... 348/59
See application file for complete search history.

(56) References Cited

U.S. PATENT DOCUMENTS

| | | | |
|---|---|---|---|
| 2003/0161040 A1 | 8/2003 | Ishii | |
| 2006/0170764 A1 | 8/2006 | Hentschke | |
| 2012/0104637 A1* | 5/2012 | Daehnert | B29D 11/00144 |
| | | | 264/1.38 |
| 2012/0113511 A1 | 5/2012 | Chen | |
| 2013/0169591 A1* | 7/2013 | Hung | C03C 21/00 |
| | | | 428/156 |
| 2014/0160395 A1 | 6/2014 | Park | |
| 2014/0320614 A1* | 10/2014 | Gaudreau | H04N 13/366 |
| | | | 348/51 |
| 2014/0340745 A1* | 11/2014 | Gibilisco | G02B 30/29 |
| | | | 359/463 |

FOREIGN PATENT DOCUMENTS

| | | | | |
|---|---|---|---|---|
| CN | 104216131 A | | 12/2014 | |
| DE | 69913433 T2 * | | 6/1999 | ............... G02B 3/00 |
| DE | 102009019762 B4 | | 11/2010 | |
| DE | 102009054706 A1 | | 6/2011 | |
| DE | 102012222466 A1 * | | 6/2014 | ............. B82Y 10/00 |
| EP | 0658779 A2 * | | 6/1995 | ............... G02B 3/00 |
| EP | 0936495 A1 | | 8/1999 | |
| EP | 0965862 A2 * | | 12/1999 | ............... G02N 3/00 |
| EP | 3147702 A1 | | 3/2017 | |
| JP | H05110960 A | | 4/1993 | |
| JP | H07225303 A | | 8/1995 | |
| JP | 0965862 A2 * | | 6/1999 | ............... G02B 3/00 |
| JP | 2000002803 A | | 1/2000 | |
| JP | 2013145254 A * | | 7/2013 | ............. C03C 17/04 |
| KR | 20190110469 A * | | 9/2019 | ............... G02B 5/20 |
| WO | 2004081863 A2 | | 9/2004 | |
| WO | 2010083192 A1 | | 7/2010 | |
| WO | WO-2014029062 A1 * | | 2/2014 | ............. B32B 37/06 |
| WO | 2014195136 A1 | | 12/2014 | |
| WO | 2015032636 A1 | | 3/2015 | |
| WO | 2017071007 A1 | | 5/2017 | |
| WO | 2017071008 A1 | | 5/2017 | |
| WO | WO-2018061465 A1 * | | 4/2018 | ......... G02B 27/2214 |

OTHER PUBLICATIONS

Korean Office Action for KR1020227034916 dated Oct. 6, 2024, 12 pages.

* cited by examiner

LENTICULAR LENS ASSEMBLY FOR MOUNTING ON A DISPLAY SURFACE AND MOUNTING METHOD

CROSS-REFERENCE TO RELATED APPLICATIONS

This application is a continuation of International Application No. PCT/EP2021/055993 filed Mar. 10, 2021, which claims priority to German application DE 102020203286.6 filed Mar. 13, 2020. The entire disclosures of the above applications are incorporated by reference.

FIELD

The present disclosure relates to optical filters for display areas and more particularly to a lenticular lens assembly and a method for attaching such a lenticular lens assembly to a display area.

BACKGROUND

It is known that content displayed on a display area can be presented three-dimensionally by means of various approaches. In particular, the content can be optically filtered, changed and/or refracted in such a way that it appears to be three-dimensional from the viewer's perspective.

An example of optical filters are so-called parallax barriers, in which case, for example, content displayed pixel by pixel is partially obscured in such a way that a viewer's left and right eye see different image content, which creates a three-dimensional perception.

Also known are lenticular lenses, which can also produce images called lenticular images, which are perceived three-dimensionally (i.e. spatially). The lenticular lens has a plurality of typically curved lens portions that are lined up in strips and run, for example, in a common spatial direction and/or along a vertical axis of the display area. Through the lens portions, the light of the display area and in particular of adjacent pixels or display units of this area is refracted differently. This is again preferably done in such a way that the left and right eyes of a viewer perceive different image contents, which can create a three-dimensional impression of a displayed image.

A common advantage of these solutions is that three-dimensional image content can be displayed on the display area without the viewer having to wear or put on so-called 3D glasses or other optical aids. The approaches described can be assigned to the field of autostereoscopy.

The display areas are typically flat devices with a plurality of individually controllable and display units typically distributed in a matrix form. Each display unit can form one pixel of the display area. For example, the display area can be an LCD panel, an OLED panel, or the like.

It is known that the display areas are not always flat due to the manufacturing process, i.e. they may have an uneven surface facing the viewer. This is disadvantageous because then an undesirable relative orientation of areas of the display area and in particular individual display units (pixels) and a lenticular lens layer can occur. This may make the desired three-dimensional presentation more difficult.

It is therefore known to attach, in addition to a lens layer in panel form or a flat lens layer, a sheet-like element to the surface of the display area facing a viewer or to the surface facing away from the viewer (rear side). For example, this element can be bonded to the display area over its entire surface, as it typically has a higher stiffness than the deformable display area and in particular than a flexible LCD display area. The display area then conforms to the shape of the sheet, which is preferably flat. In other words, the display area can thus be smoothed by the sheet-like element. The lens layer is then subsequently applied to a surface of the sheet-like element facing outwards or towards the viewer and away from the display area.

Thus, a step-by-step procedure takes place, for example within an automated production line, in which first the sheet-like element (smoothing element) and then the lens layer or lens sheet are applied to the then smoothed display area.

In principle, it is also known to then apply a type of protective layer or protective sheet to the lens structure itself in a further production step. This is preferably in turn smooth, so that an outwardly flat surface is formed and the curved lens portions are not exposed, so to speak, or are not directly accessible from the outside.

SUMMARY

However, it has been found that with such previous approaches it is not always possible to achieve the desired (three-dimensional) display quality or to achieve a lenticular effect in the desired way. Also, the described successive manufacture by applying individual layers for the production or coating of different display areas is not always sufficiently flexible and generally requires an increased complexity of a finishing production line.

There is thus a need to improve the presentation of three-dimensional content using display areas and, in particular, to make their production more flexible and less complex.

This object is achieved with the subject matter of the appended independent claims. Advantageous developments are defined in the dependent claims. All of the above explanations and features can also apply to or can be provided in the present solution, unless otherwise indicated or apparent.

In accordance with the invention it has been recognised that the attachment of previously used sheet-like smoothing elements is not always possible if a minimum presentation quality is to be maintained. Thus, in order to achieve a desired lenticular effect or a sufficient (three-dimensional) display quality, maximally permissible distances between the display area and the lenticular lens layer should at best not be exceeded. These distances can depend, for example, on the pixel size or pixel density of the display area, on the properties of the materials used, on geometric parameters (in particular of the lens layer) or also on a type of control of the individual display units (pixels) of the display area, for example a multiplex scheme. A desired or intended distance of the viewer from the display area can also play a role.

In particular, it has been recognised that for very high pixel densities of more than 100 ppi (pixels per inch) and especially more than 150 ppi or more than 200 ppi, particularly small distances between the lens layer and especially its curved lens portion and the display area can be advantageous. In principle, this could be achieved by arranging the lens layer in such a way that its curved lens portions face or are opposite the display area. However, it may then not always be possible to still place previous sheet-like smoothing elements between the lens layer and the display area without exceeding a permissible maximum distance between the lenses and the display area. This is solved by the multi-layer solution according to the invention explained below.

To achieve optical refractive effects, it is also preferable to have a sufficient difference in refractive indices between the lens curvatures or curved lens portions and an immediately adjacent material. However, if the curved lens portions are to face the display area, as described above, mounting problems arise as full-surface bonding with conventional materials may complicate the difference in refractive indices to be provided. Embodiments of the invention therefore propose a novel multilayer structure as explained below.

In principle, it was also recognised in accordance with the invention that the complexity of the production processes of (three-dimensional) display areas can be reduced by the fact that the layers applied to the display area are no longer successively applied and individually bonded, for example within a finishing production line, but are at least partially already provided as prefabricated modules or assemblies. This can reduce the number of necessary manufacturing steps and manufacturing stations.

In particular, the invention proposes a prefabricated lenticular lens assembly in which a plurality of layers are already connected together and, in particular, bonded together. This assembly can then be applied to the display area as such or in a single step in a closed manner.

Furthermore, this assembly is advantageously formed in such a way that it can also be applied to a plurality of different display areas and, in particular, can be applied to the display area in different ways (for example with a different orientation and/or side) depending on the requirements and/or properties of the display area. For example, depending on the pixel density of the display area, the assembly can be attached to or oriented towards the display area either with a first surface or a first side, or with a second surface and/or side. In particular, different distances between the display area and a lenticular lens layer or the curved lens portions of this assembly can then be set depending on the corresponding orientation of the assembly, for example because the distance of this (inner) layer to the corresponding surfaces or sides of the assembly is different.

Overall, a compact assembly that is suitable for prefabrication is provided that reduces the requirements for a finishing production line, but which can be used flexibly. In particular, it is made possible that for the different purposes or orientations of the assembly, the production process or the production stations or devices used for this only have to be adapted to a limited extent or not at all (for example, if the assembly is delivered and/or supplied with the desired orientation).

In detail, a prefabricated lenticular lens assembly for attachment to a display area (for example digital and/or having a pixel array) is proposed, having
- a lenticular lens layer comprising a first surface having a plurality of curved lens portions and a second surface facing away from the first surface;
- a cover layer, which is at least in some regions opposite the first surface of the lens layer;
- a carrier layer, which is at least in some regions opposite the second surface of the lens layer.

Due to its prefabrication, such a lenticular lens assembly offers the advantage that no separate manufacturing stations or manufacturing steps need to be provided in a finishing production line for applying each individual corresponding layer. Instead, within the lenticular lens assembly, the lenticular lens layer, cover layer and carrier layer can be connected together, and in fixedly connected, so that they cannot separate from each other, for example under their own weight. As described herein, a material connection (for example a bond) between the layers or of the layers to each other can be provided.

More specifically, it is preferably provided that the lenticular lens layer, the cover layer, and the carrier layer are connected together even if the assembly has not yet been or is not yet attached to the display area. In other words, said layers can already be connected together and, for example, adhered to each other, glued to each other and/or fixed within the assembly before the assembly is attached to the display area. Instead, the assembly can also be prefabricated in a separate production line, by a separate manufacturer or generally separated in space and/or time. It can then, for example, also be temporarily stored and/or transported to the finishing production line of a display device with the corresponding display area. There, it can be attached to the display area as such or as a whole as well as in a preferably only single manufacturing step, so that the manufacturing complexity there is reduced.

As mentioned, the display area can be a digital and/or electronic display area and in particular a computer screen. For example, the display area can be provided for or can form a display area on a mobile terminal, a TV or computer screen, a tablet screen, or a smartphone screen. The attachment of the assembly to the display area can comprise bonding, in particular at least partial or also full-surface bonding of the assembly to the display area.

Any layer described herein can be characterised by having a planar form and/or extension (but optionally with curved surface portions). Compared to this typically two-dimensional extent, any layer can have a smaller thickness (in the transverse direction to the two-dimensional extent). For example, this thickness can comprise less than 10% of the two-dimensional dimensions. The shape and/or size of the layers or two-dimensional planes defined thereby can correspond to that of the display area.

The layers are preferably flat, but not necessarily rigid. For example, they can also be designed as films. The latter can apply in particular to the cover layer, which, according to the following embodiments, can optionally be removed manually before being attached to the display area, which is facilitated by a film-like design.

The first and second surfaces of the lenticular lens layer can also be referred to as the first and second sides, for example front and rear side, of the lens layer. The lens portions can be generally convexly curved. The lens portions can in principle be of the same kind as well as adjoining each other. In this way, a uniform (line) array or even pattern of lens portions arranged in a row can result, as is known in the prior art. Due to the corresponding curvature, light emitted from a display area and in particular from pixels located under a lens portion can be refracted in such a way that the left and right eyes of a viewer perceive different image contents.

Generally, it can be provided that a lens portion spans a plurality of neighbouring pixels, wherein the light of the adjacent pixels can also be refracted differently from each other due to the lens curvature.

The cover layer can cover and/or conceal the first (curved) surface of the lens layer, at least in some regions. When viewed from the outside, the lenticular lens assembly can have, in the region of the cover layer, a smooth and/or flat surface, which is formed by the cover layer. In particular, the curvature of the lens portions might not be pronounced or exposed on an outer face of the assembly, but instead may be concealed and/or shielded by the cover layer.

In general, it can be provided that the cover layer and carrier layer form at least some of the outer sides or faces of the assemblies, in particular opposite faces or sides of the assembly.

The lenticular lens assembly preferably can be selectively attached to the display area in such a way that either the cover layer (or an assembly side or face from which the cover layer has been removed) or the carrier layer faces and/or is bonded to the display area. Depending on the chosen orientation of the assembly, the first surface of the lenticular lens layer or the curved lens portions can then be positioned further away (in particular when the carrier layer is attached to the display area) or closer (in particular when the cover layer or the side from which the cover layer has been removed is attached to the display area) to the display area.

In accordance with the invention, this optional orientation of the assembly can be made possible, for example, by the fact that both the cover layer and the carrier layer are flat and/or smooth. In addition or alternatively, they are preferably also designed in such a way that they do not generate any undesired light refractions (in particular light refractions that negatively impair the lenticular effect). For this purpose, the layers are preferably not additionally coated externally (for example with a so-called anti-glare layer) or such an additional layer is only applied when the determination regarding the orientation to be adopted has been made.

Another general advantage of a smooth and/or flat design of the cover layer and/or carrier layer is that a reliable smoothing effect can be achieved with regard to the display area. In particular, this can then be smoothed evenly, so that an even distance between the display area and, for example, the lens layer can also be produced. This also applies when the cover layer is removed from one side or face of the assembly. This exposed side can likewise be correspondingly smooth due to the preferably flat cover layer.

The assembly can also be referred to as a sandwich or sandwich filter. This takes into account the fact that the lenticular lens layer is preferably positioned and/or enclosed between the cover layer and carrier layer. In particular, no other layer, with the exception of any adhesive layer or optional filler materials discussed below in a space between the lenticular lens layer and the cover layer, may be comprised by the assembly or at least positioned between the cover layer and the carrier layer, except for the lenticular lens layer. The lenticular lens layer can thus be arranged and/or embedded directly between the carrier layer and the cover layer. This increases the compactness of the assembly.

First of all, the cover layer offers the advantage that it at least partially shields the curved lens portions from the environment and thus protects them, for example, from soiling or damage (especially when the assembly is oriented so that the cover layer faces outwards).

If the cover layer is flat, as is generally preferred, it can also facilitate attachment to the display area and, in particular, flat attachment and/or flat bonding to the display area (especially when the assembly is oriented so that the cover layer faces inwards or is attached to the display area).

Furthermore, the cover layer can also serve to prevent the penetration of an adhesive layer into a space between adjacent lens portions (for example up to a foot or root point of the curvatures), for example when the assembly is bonded to the display area (then, again, with a cover layer oriented inwards from the viewer's perspective). Instead, a defined material transition and thus a desired refractive index difference near to or at the lens portion can be created by means of the cover layer. This can be achieved by shielding the space between the lens layer, and in particular its first surface, and the cover layer from the outside by the latter. As will be explained below, this space can contain air, for example, or some other defined material that can be held there and/or shielded from the outside by the cover layer, so to speak.

In principle, the cover layer can also provide (when attached to the display area) a desired smoothing effect as explained above, at least partially.

In general, and in particular in all of the above examples, the cover layer can be rigid and, for example, sheet-like. It can, however, also be flexible and/or in the form of a film (cover layer film). The latter is preferably provided when a material is present in a space between the lenticular lens layer and the cover layer (i.e. no vacuum or only air is present there). The material can provide an adhesive action and/or can be connected to the film at least predominantly by adhesion and preferably without the use of additional adhesive. After removal of the cover layer, which can be done generally manually and/or by means of forces in the manually applicable region, the adhesion effect of this material can be used for adhering the assembly to the surface of the display area. This will be explained in more detail below in conjunction with a separate development.

In principle, even in the case of a removable cover layer, it is preferably possible to attach the assembly with different orientations to a display area. The cover layer can provide the general functions of a cover layer described here, and in particular protection against soiling, if it is oriented outwards (towards the viewer). However, the variant of a removable cover layer is particularly advantageous when using a filling material with an adhesive effect as described above, since the assembly can then adhere to the display area without additional adhesives. This saves production materials and production steps.

The carrier layer, on the other hand, is arranged on the rear side of the lenticular lens layer or is opposite this rear side (i.e. the second surface) with respect to the curved lens portions. In general, the second surface of the lens layer is preferably flat or smooth. The same preferably also applies for the carrier layer.

The carrier layer can perform the function of a sheet-like smoothing element as explained above, depending on the orientation of the assembly relative to the display area. The carrier layer can generally provide a stabilising effect or, in other words, a stiffening effect for the assembly. This also allows the cover layer to be made comparatively thin and/or less rigid, for example.

When orienting the assembly so that the cover layer (or a side from which it has been removed) faces the display areas, the curved lens portions can be spaced a small distance from the display area (substantially equal to the thickness of the cover layer, for example, plus any spacing between the cover layer and lens portions). The carrier layer can be dimensioned and/or can have a stiffening effect such that the cover layer, despite being thin, can still provide a desired smoothing effect when attached to the display area, for example, because it is at least indirectly supported on the underside by the carrier layer and/or the assembly in general. Equally, however, the carrier layer can indirectly stabilise or support an exposed side of the assembly, for example consisting of a filler material with an adhesive effect and/or from which the cover layer has been removed.

Any layers mentioned herein can, for example, be made of a glass material, or a precisely or generally transparent plastic. In this respect, instead of a cover layer and carrier layer, reference could also be made to a cover glass and a carrier glass, respectively. The cover layer and/or carrier layer can be provided with an anti-reflective coating, in particular that of the cover layer and carrier layer which faces away from the display area (i.e. which is positioned externally). In the case of a film-like configuration of the cover layer in particular, the material thickness can be chosen to be correspondingly small and, for example, to be less than 0.15 mm.

A further advantage of the disclosed assembly is that the scope for selecting adhesive materials or other layers or materials to be arranged between the assembly and the display area is increased, if required. This results in particular from the material transition that can be adjusted in a defined manner by means of the cover layer and/or a filler material between cover layer and lens layer, and thus the refractive index difference that can be adjusted in a defined manner in the region of the curved lens portions (i.e. the difference between the material of the space between lens portion and cover layer and the material of the lens portions themselves). For example, adhesive materials with a relatively high refractive index can then also be used, which are common and, above all, cheap in the present technical field. If these were used directly for bonding the curved lens portions (i.e. in such a way that they adjoin and contact the lens portions), a desired refractive behaviour could possibly no longer be achieved and the quality of the three-dimensional presentation could be reduced.

In the variants with a removable cover layer and in particular a cover layer film, the cover layer also offers the advantage that a filler material can be arranged within the assembly between the lens layer and the cover layer in order to set the desired refractive index difference in a defined manner. As mentioned, in this case, due to a preferably existing adhesive effect of the filler material, additional adhesive layers between the assembly and the display areas can then also be completely dispensed with, which can also facilitate the setting of a desired refractive behaviour.

The layers within the assembly can be connected indirectly, for example via a frame, frame portion or other supports running in an edge region of the assembly, preferably circumferentially. A direct connection, for example via adhesive layers or bonding of at least some of the layers to each other, is also possible. For example, if such an adhesive layer is provided between the cover layer and the lenticular lens layer, its refractive index is preferably low (for example, less than 1.4) to allow the desired refractive index difference from the lens material.

Advantageously, however, the present assembly allows air or a vacuum to be present between the cover layer and the lenticular lens layer. The cover layer is then preferably dimensionally rigid and/or non-removable and in particular not a removable film. In particular, it can be provided that the cover layer does not bear against the lenticular lens layer or at least the curved lens portions. Then, in particular, air or vacuum with a correspondingly low refractive index can adjoin the curved lens portions in order to achieve the desired refractive behaviour of the lens layer.

The at least indirect bonding of the lenticular lens layer, cover layer and carrier layer within the assembly can take place in such a way that these (but at least the carrier layer and lenticular lens layer) can subsequently no longer be separated from each other, for example manually and/or by muscular force, or at least not in a non-destructive manner. This cannot apply to a cover layer film that can be deliberately removed manually. However, the layers can at least adhere to each other under their own weight (or, for example, up to at least twenty times the weight of the assembly), and preferably also during the process of attaching or mounting the assembly to the display area.

Generally, any reference herein to two faces facing each other can also include such faces bearing against and/or contacting each other, unless otherwise indicated or apparent (for example, because there are other materials or a space between the layers).

A development provides that the cover layer is thinner than the carrier layer and/or the lenticular lens layer. Here, the term "thinner" refers to the layer thickness. In particular, the cover layer can have no more than half or even no more than 30% of the layer thickness of the carrier layer and/or the lenticular lens layer. This enables the cover layer to provide its, for example, protective and/or shielding function, but on the other hand does not unnecessarily increase a distance of the curved lens portions to the display area. Then, if necessary, the assembly can still be attached to the display area in such a way that the curved lens portions (i.e. the first surface of the lenticular lens layer) face the display area. This allows the lenticular lens assembly to be used especially on display areas with very high pixel density.

A further embodiment provides that the cover layer has a lower stiffness than the carrier layer and/or the lenticular lens layer. This also makes it possible for the cover layer to be comparatively thin and for a stabilising or smoothing effect, for example, to be significantly attributed to or provided by the carrier layer and/or lenticular lens layer.

According to a further embodiment, the cover layer has a thickness of approx. 0.1 mm to approx. 0.3 mm. Alternatively or additionally, the carrier layer can have a thickness of approx. 0.5 mm to approx. 4 mm. It has been shown that with such size ratios, the advantages and properties of the cover layer and carrier layer described herein, and in particular their respective assigned functions, can be reliably achieved, but without, for example, unnecessarily increasing the costs or impairing the optical properties of the assembly. For example, an appropriately formed carrier layer can be reliably used as a sheet-like smoothing element of the type mentioned above, but can also still provide these functions at least to a certain extent from the cover layer (in particular due to indirect support by the corresponding carrier layer), wherein the cover layer then allows a short distance of the curved lens portions to the display area.

If the cover layer is formed as a removable layer and in particular as a cover layer film, its thickness can also be below the above values and, for example, it can have a thickness of less than 0.1 mm.

As mentioned, a preferred variant provides that the cover layer and/or the carrier layer are flat. This facilitates for example cleaning by wiping (if the corresponding layer forms an outer layer of the attached assembly). On the other hand, this makes it easier to attach to a flat display area (if the corresponding layer forms an inner layer of the assembly or a layer attached to the display area).

One development provides that the lenticular lens layer is integrally bonded to at least one of the cover layer and the carrier layer. The integral bond can be full-surface or can overlap at least in some regions with the display area (for example from the viewer's perspective). Alternatively or additionally, the material bond can be formed in an edge region which lies, for example, outside a region of the display area which can be recognised by the viewer and/or generally outside a field of view of the viewer. By means of the material bond, a reliable and firm connection of the layers within the assembly can be achieved, which can also be easily manufactured.

According to a further aspect, a space between the cover layer and the lenticular lens layer is unfilled at least in some regions. In particular, this can apply to a region of the (attached) assembly overlapping with the display area and/or to a region that lies within a field of view of the viewer. In particular, it can be a central region. The region can occupy more than 50% and, for example, at least 80% of the area of the assembly and/or of said layers. In this case, the cover layer is preferably dimensionally stable and/or designed as a sheet.

The phrase "unfilled" can be understood to mean that there is no solid or liquid material (or generally no particulate matter) between the layers, for example no adhesive layer. On the other hand, however, a gas or a gas mixture (in particular air) may be present in the space. However, it is also possible to create a vacuum between these layers. As mentioned, a preferred refractive behaviour of the lenticular lens layer can be achieved in this way due to the difference from the refractive index to the then typically lower refractive index of the unfilled space.

In particular, it can be provided in this context that the cover layer does not bear against or contact the curved lens portions. Instead, contact with the lenticular lens layer on the part of the cover layer can only be present in an edge region of the assembly. In an attached state of the assembly, this edge region is preferably outside a region of the display area that is visible to the viewer and/or is covered by a trim frame or the like.

Preferably, the cover layer and the lenticular lens layer are hermetically connected, for example by a hermetic circumferential edge bonding of these layers to each other.

In an alternative aspect, the space between the cover layer and the lens layer is at least partially filled with a (then preferably liquid, solid and/or solidified) material (also referred to herein as filler material). In this case, the refractive index of this material is preferably below a refractive index of the lens layer (or, more precisely, of the material of the lens layer). The material in the space can be, for example, an adhesive material, such as a silicone material or other polymeric material. This enables a reliable connection of the layers and in particular a possible full-surface or at least large-surface bonding of these layers to or with each other.

Appropriate bonding allows a secure connection of the layers to each other. However, since materials and in particular adhesives with a sufficiently low refractive index are comparatively costly, it can be advantageous to alternatively resort to the variant discussed above of an unfilled space (for example only filled with a gas) with possible edge bonding.

The space between the lens layer and the cover layer can also be filled with a material with an adhesive effect to which the cover layer adheres (preferably manually removably). The adhesive effect can also be used to bring the material into direct contact with the display areas and to create adhesion of the assembly to the display area. For example, a silicone material can be considered for such a material. The material also preferably provides all of the refractive effects described herein of a corresponding filler material. In this variant, the cover layer is preferably in the form of a cover layer film.

Despite the preferred adhesion force of the filling material, an adhesive layer can also be additionally or alternatively applied between the display area and the assembly. However, this may not be necessary if the adhesive force is sufficient and is preferably not provided for cost reasons.

Preferably, the material in the space (in any of the filled space variants referred to herein) has a refractive index of no more than 1.3. By contrast, the lens layer can generally have a refractive index of, for example, 1.4 to 1.8 inclusive or up to 2.0 inclusive. In particular, the lens layer can be made of an acrylate or another transparent plastic.

According to an aspect already indicated above, a further embodiment provides that the cover layer (which is preferably a film, for example made of a glass or plastic material) is removable (from the assembly) prior to an attachment of the assembly to the display area, for example by peeling the cover layer from the assembly and in particular from a (filler) material between the lenticular lens layer and the cover layer. This material can thus be selectively exposed, wherein the assembly is preferably oriented relative to the display areas such that the material or side from which the cover layer has been removed faces the display areas.

Preferably, the space between the cover layer and the lenticular lens layer is at least partially filled with a material that allows the assembly to adhere to the display area. As described, this material can, for example, provide an adhesive effect. The surface of this material is preferably flat, in particular after removal of the cover layer, in order to enable attachment to the display area. The carrier layer can have a stabilising and/or stiffening effect on the assembly during mounting, so that the material can be smoothed at the latest when it is pressed against the display area.

It should be noted that the material in the space preferably not only provides the adhesive effect, but also the refractive function mentioned herein, i.e. it also has a specific optical effect.

In general, the adhesive effect can be supported by attaching the assembly to the display area in a vacuum. In this way, any remaining air between the assembly and the display area can be reliably removed.

To ensure removal of the cover layer or cover layer film from this material, a release agent (for example a non-adherent release liquid or release film) can be applied between the cover layer and the material.

A general advantage of the variant with removable cover layer, besides a preferred omission of additional adhesive layers when attaching the assembly to the display area, is that the lenticular lens layer can be positioned even closer to the display area due to the removed cover layer.

In addition, this variant makes it easier to remove the assembly from the display area (and also reattach it thereto if necessary) than if separate adhesive layers were used. Such removability is advantageous for maintenance purposes or for the repair of production defects.

As mentioned, the cover layer can be arranged at a distance (of for example not more than 1 mm or even not more than 0.5 mm) from the lens portions. In other words, the cover layer can preferably not contact and/or bear against the lens portions. As described, this ensures that the refractive behaviour of the assembly and in particular of the lens layer is largely determined by the material transition from or in the space. The cover layer or an additional adhesive layer on the outside for attaching the assembly to the display area, on the other hand, can only have a limited influence on the optical filter effect.

Also mentioned was the embodiment according to which the lenticular lens assembly can optionally be attached to the display area in such a way that either the cover layer (or a side from which this has been removed) or the carrier layer is opposite the display area and, in particular, is bonded thereto over the entire surface.

In particular, it can be provided that, when a pixel density of the display area exceeds a predetermined threshold (for example 100 ppi), the cover layer (or a side from which it has been removed) faces and/or is bonded to or adheres to the display area. Indeed, then the distance between the display area and the curved lens portions can be particularly small due to the typically thinly formed or even removed cover layer and/or generally the proximity of the cover layer to the curved lens portions. On the other hand, in the case of uneven display areas or generally to achieve a particularly reliable smoothing effect, it can be advantageous to arrange the carrier layer opposite the display area and/or to attach it directly thereto.

The invention also relates to a method for producing a lenticular lens assembly according to any one of the preceding aspects.

This can include connecting a lenticular lens layer, cover layer and carrier layer together in the aforementioned layer sequence. In particular, this can include any of the bonding mechanisms described herein (for example, full-surface or at least partial bonding or edge bonding or indirect bonding via circumferential frames). For example, it can be envisaged to arrange a cover layer according to any variant described herein opposite a first surface of a lenticular lens layer (also according to any variant described herein) and to arrange a carrier layer (which may also be formed according to any variant described herein) opposite a second surface of the lens layer. Further, the production can include producing a connection between at least the cover layer and the lenticular lens layer, and also the lenticular lens layer and the carrier layer. Thus, in general, at least the cover layer and the carrier layer may not be directly bonded to each other, but may only be indirectly bonded to each other, for example, via the lenticular lens layer. Further, the method can comprise applying a release agent between a material (preferably located in the space between the lenticular lens layer and the cover layer) and the cover layer, in particular if the cover layer is to be removable.

It is generally preferred that the step of producing the lenticular lens assembly precedes an actual attachment to a display area and/or takes place within a physically separate production line.

Correspondingly, according to a development, it can be provided that the method also comprises attaching the produced lenticular lens assemblies to a display area. The attachment can comprise a full-surface bonding of the prefabricated or finished assembly and in particular either of its cover layer or of its carrier layer to the display area. Alternatively or additionally, it can comprise removing (in particular manually peeling off) the cover layer and in particular any cover layer film from the assembly in order to attach and in particular press on the assembly and in particular its side exposed from the cover layer to the display area.

In particular, it can be envisaged that when the display area has a pixel density greater than 100 ppi, the lenticular lens assembly is attached to the display area in such a way that the cover layer (or else a side from which the cover layer has previously been removed) faces the display area. Then, the already discussed smallest possible distance between the curved lens portions (or also the lens surface) and the display area is achieved. If, on the other hand, the resolution is below this threshold, or if a comparatively large viewing distance (of more than 1 metre, for example) is to be achieved, the carrier layer can be attached to the display area or arranged opposite it.

In a further embodiment, a plurality of identical lenticular lens assemblies are produced in accordance with any variant described herein, and at least a first and a second display area (which are then preferably different from each other and for example have a different pixel density) are provided. It can be provided here that one of the lenticular lens assemblies is attached to the first display area such that the cover layer (or a side from which the cover layer has been removed) faces the display area, and that another of the lenticular lens assemblies is attached to the second display area such that the carrier layer faces the display area. In this example, the first display area can have a higher pixel density than the second display area.

This method refinement further illustrates that the present lenticular lens assembly can provide optional optical properties depending on which of the cover layer (or side from which it has been removed) and carrier layer is placed opposite the display area or attached directly thereto. This increases the flexibility of use of the lenticular lens assembly, which can be arranged or attached with a different orientation relative to the display area, depending on the desired properties.

In general, the method can comprise any further features, aspects, and variations to provide any conditions, advantages and interactions described herein. In particular, the method can comprise all measures for producing a lenticular lens assembly according to any aspect described herein and/or for attaching a lenticular lens assembly to a display area in any manner described herein. In particular, all of the embodiments and developments of the features of the lenticular lens assembly can also apply to or be provided with corresponding features of the method.

BRIEF DESCRIPTION OF THE DRAWINGS

The invention is explained below by way of example using the attached schematic figures. Features of the same kind or having the same effect can be given the same reference signs across the figures.

DETAILED DESCRIPTION

Figure 1:
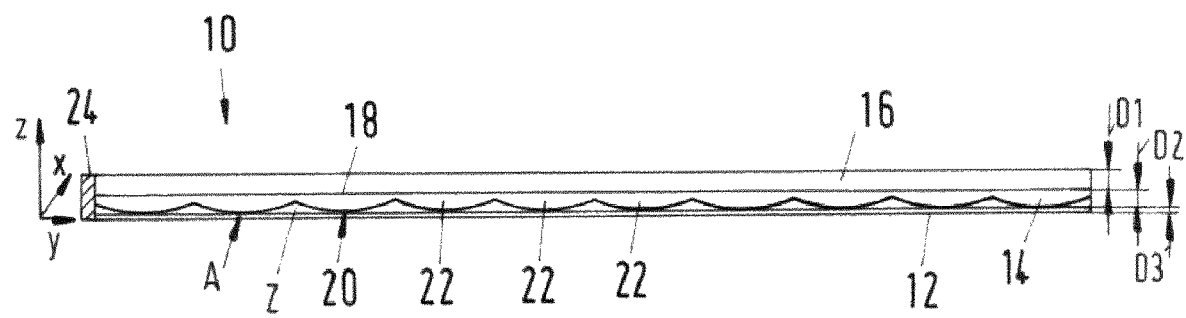
FIG. 1 shows a side view of a lenticular lens assembly according to an exemplary embodiment of the invention.

FIG. 1 shows a side view of a lenticular lens assembly 10. The lenticular lens assembly 10 (hereinafter also referred to simply as the assembly) extends into the drawing sheet plane, as is also clear from the perspective view of FIG. 2. The illustrations chosen are merely schematic and exemplary. In particular, the individual lens portions 22 explained below could extend obliquely within the X-Y plane, which is also referred to as "slanted" in technical language.

It can be seen that the assembly 10 has a layered structure. Layers are provided here along a height axis z, along which layer thicknesses discussed herein can also be measured, according to the following sequence: The lowest layer in FIG. 1 is a cover layer 12, the following layer is a lenticular lens layer 14, and the uppermost layer in FIG. 1 is a carrier layer 16.

The lenticular lens layer 14 is thus arranged between the layers 12, 16 as viewed along the height axis z. The assembly 10 can therefore also be referred to as a sandwich filter, wherein the filter property is provided in a manner known per se by the lenticular lens layer 14. Figuratively speaking, this filters the contents visible to each eye of the viewer, which are displayed by a display area 100 explained below (see FIG. 2).

All of the layers 12, 14, 16 extend in a horizontal spatial plane (for example in the x-y plane of FIG. 1). They are therefore also perpendicular to the drawing sheet plane.

The different layer thicknesses are also shown: The carrier layer 16 has a thickness D1, the lenticular lens layer 14 (hereinafter also referred to simply as the lens layer) has a thickness D2 and the carrier layer 12 has a thickness D3. It can be seen that the thickness D3 of the cover layer is significantly less than that of the carrier and lens layers 16, 14. For example, the thickness D3 can be only half the thicknesses D1, D2 of at least one of the other layers 14, 16 or as little as a quarter thereof. The carrier layer 16, but preferably also the lens layer 14, also has a higher stiffness than the cover layer 12. In addition or alternatively to the choice of a comparatively large thickness D3, this higher stiffness of the carrier layer 16 can also be achieved by a suitable choice of material. In general, however, it is also possible to form the lens layer 14 with a small thickness D2, which is, for example, equal to or less than the thickness D3, but preferably not more than the thickness D1. In particular, the lens layer 14 can have a thickness D2 of 0.1 mm or less.

The carrier layer 16 and the cover layer 12 are both flat and generally smooth. The focus here is on the surfaces of these layers 12, 16 running in the x-y spatial plane. They each form outer sides of the assembly 10.

The lens layer 14, on the other hand, has only one smooth and flat surface 18. This is the surface referred to herein as the second surface 18, which in FIG. 1 is at the top or faces the carrier layer 16 and rests against it. More precisely, the carrier layer 16 is preferably fully bonded to this second surface 18 of the lens layer 14. The latter is made possible by a correspondingly smooth and flat formation of the second surface 18.

On the opposite surface 20 of the lens layer 14, referred to herein as the first surface 20, the lens layer 14 is curved in some portions. More specifically, it has a plurality of curved lens portions 22, which in FIG. 1 run along the x-axis, i.e. are perpendicular to the drawing sheet plane (see also perspective view of FIG. 2).

Along the other axis of the horizontal extent (i.e. along the y-axis), the curved lens portions 22 are lined up next to one another or merge into one another. For reasons of clarity, not all lens portions 22 are given their own reference sign in the figures.

The lens portions 22 are convexly curved, for example with respect to the second surface 18. In other words, they extend outwards away from this surface 18 or form (for example opposite/out of the layer plane) protruding curved portions at the first surface 20. Further, the lens portions 22 extend in some portions in the direction of the cover layer 12.

The lens portions 22 thus form a lens array or line array that is known per se. Such lenticular lenses or lenticular filters are available on the market.

The cover layer 12 faces the multiply curved first surface 18 of the lens layer 14. It is not separately recognisable that the cover layer 12 does not lie against the lens layer 14 or also at least not against curved lens portions 22. However, this is schematically indicated by way of example in one case as a distance A. This distance A can be less than any of the layer thicknesses D1-D3 or at most equal to the thickness D3.

In this way, the size of the assembly 10 is reduced and it is still possible for the lens layer 14 and in particular its first surface 20 (if required) to be arranged particularly close to a display area 100.

Furthermore, this distance A allows the optical properties or the refractive behaviour of the assembly 10 to be adjusted reliably and in a defined manner. This depends to a large extent on the material transition between the space Z between the cover layer 12 and the lens layer 14 and the lens layer 14 itself. As shown in FIG. 1, this space Z extends between the flat inner side of the cover layer 12 and the first surface 20. The space Z thus extends in particular into the free space between two adjacent lens portions 22, figuratively speaking into the depressions or valleys which are delimited by two adjacent lens portions 22.

According to one variant, it is possible that a material is introduced into the space Z. This material then preferably has a lower refractive index than the material of the lens layer 14, for example a refractive index of less than 1.4. The material can be an adhesive material with which the cover layer 12 is connected to the lens layer 14.

Alternatively or additionally, it can also be provided that the cover layer 12 and the lens layer 14 (but preferably also the carrier layer 16) are connected to each other via an edge bonding 24. This also preferably runs in the horizontal plane and has a thickness which corresponds at least to the thicknesses of the layers 12-16 to be connected (i.e. at least D2 and D3, optionally also D1). Furthermore, the edge bonding 24 surrounds and/or encircles the assembly 10 at least in some portions. In particular, it can surround and/or enclose the assembly 10 and its layers 12, 14, 16 like a frame.

Figure 2:
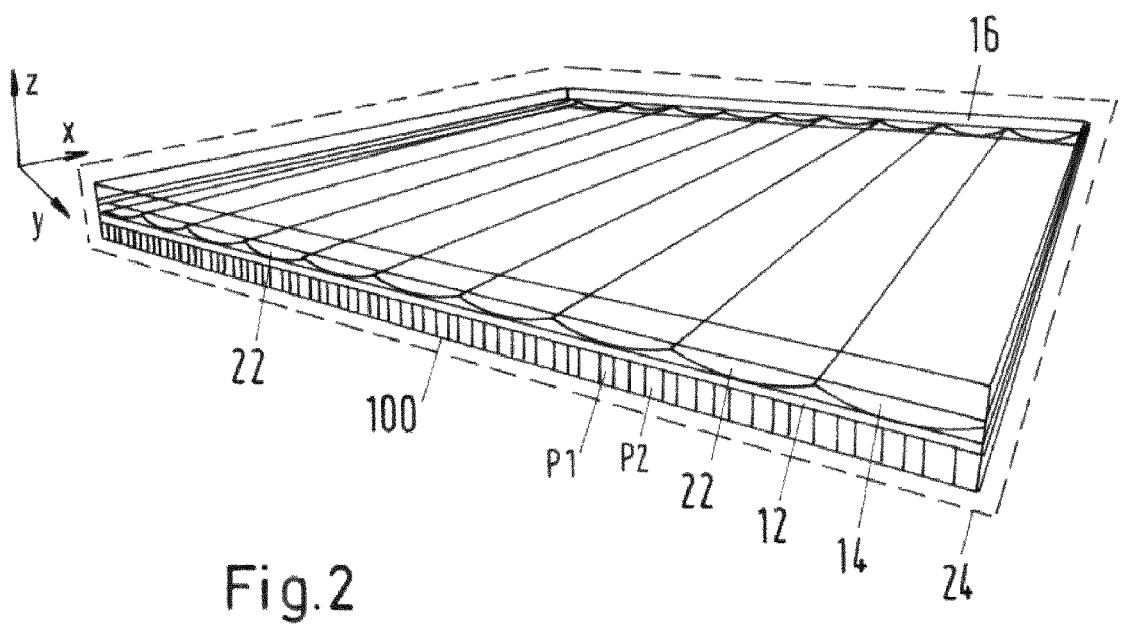
FIG. 2 shows the lenticular lens assembly of FIG. 1 in a state attached to a display area.

A schematic course of such a frame-like edge bonding 24 is shown in dashed lines in FIG. 2. It is shown that the edge bonding 24 can then also extend in the two-dimensional plane of the assembly 10 or of its individual layers 12, 14, 16. Preferably, the edge bonding 24 allows a sealing of the space Z from the environment and in particular a hermetic seal.

The space Z can generally also be unfilled (i.e. not filled with any solid or liquid material, but optionally with a gas). Particularly in the context of hermetic edge bonding, a vacuum can also prevail there, or alternatively air or another gas mixture can be provided.

As also discussed in the general description part, the layers 12 and 16 can be made of a glass material and the lens layer 14 can comprise an acrylate.

It has thus been shown above that the layers 12, 14 and 16 are connected to each other. In particular, they are bonded to each other, for example directly to each other or by means of the edge bonding 24. The connection is made here in such a way that the assembly 10 is present as a separately manageable module and can be removed from a production line for example in the form of an end product, can be packaged, and, if necessary, shipped. A fixed connection can be understood here to mean that the layers 12, 14, 16 cannot be separated from each other, for example by muscular force, without being destroyed. In particular, forces of at least 100 Newtons may be required to separate the layers 12-16 from each other, but then preferably also not non-destructively.

Thus, the assembly 10 is present as a single module or fixedly connected unit, even though it is not yet attached to a display area 100. Instead, it may be prefabricated and, if necessary, stored or shipped and then attached to a display area 100 in the manner described below. The latter may be performed, for example, on the production line of a display device or general electronic device that includes the corresponding display area 100.

It should also be emphasised that, as explained below with reference to FIG. 2, the assembly 10 can be applied to a display area 100 by means of various orientations. In principle, this can be done in such a way that the cover layer 12 is directly opposite the display area 100 or the carrier layer 16. Preferably, these layers 12, 16 are then bonded to the display area 100 (in particular bonded over the full surface).

If the carrier layer 16 is opposite the display area 100, it can act particularly effectively as a smoothing element as discussed above due to its increased rigidity and, for example, can smooth out any unevenness of the display area 100. The cover layer 12 can also provide such a smoothing effect when attached to the display area 100 (for example, indirectly supported and/or stiffened by the carrier layer 16).

When the carrier layer 16 faces the display area 100 and is preferably bonded thereto, the cover layer 12 faces outward. In this case, the cover layer 12 forms a smooth outer surface of the assembly 10. This can also form an outermost surface of the display device or delimit the display area 100 to the outside (or also from the outside). In this case, the cover layer 12 is advantageous in that it protects the lens layer 14 from damage and dirt. At the same time, the preferred flat configuration of the cover layer 12 enables easy cleaning and, in particular, easy wiping of the assembly 10 or display area 100.

In FIG. 2, an alternative configuration is shown in which the assembly 10 is attached to a display area 100 in such a way that the cover layer 12 faces the display area 100 and, in particular, rests against it. Due to the small layer thickness D3 of the cover layer 12, this means that the curved lens portions 22 or the first surface 20 of the lens layer 14 is positioned at a smaller distance from the display area 100 than if the carrier layer 16 were attached to the display area 100 (i.e. than if the assembly 10 were attached to the display area 100 with the opposite orientation).

As described above, this small distance is particularly advantageous when the pixel density of the display area 100 is high in order to achieve the desired lenticular effect (i.e. to provide the spatial perceptibility of the displayed content).

In the case of FIG. 2, in which the cover layer 12 is attached to the display area 100, the carrier layer 16 faces outwards. There it forms a particularly reliable protection, especially against mechanical damage, as it has an increased layer thickness D1 and preferably also an increased rigidity.

It is only schematically indicated in FIG. 2 that the display area 100, which is an LCD display by way of example, has a plurality of individual display regions and, more precisely, display units P1, P2. These are formed in a known manner as individually controllable pixels (in particular LCD pixels). The display area 100 or the display device in which it is installed can have the power supplies and/or control units known in the prior art in order to specify contents to be displayed by the display units P1, P2. The contents are displayed as or by means of light waves generated by the display units P1, P2. The light emitted from each unit P1, P2 is then refracted or optically filtered by the lens layer 14 to achieve the desired lenticular effect in a manner known per se.

It has thus been shown that, depending on the properties of the display area 100 or also the generally desired properties of a device in which this display area 100 is installed, the assembly 10 can be attached with an elective orientation of the layers 12, 14, 16 in relation to the display area 100. Accordingly, the assembly 10 has a high degree of application flexibility and can therefore also be used with different display areas 100.

Further, in a final assembly line, less complex manufacturing stations and manufacturing steps are required than if the layers 12, 14, 16 were to be attached to the display area 100 individually. Instead, it is only necessary to determine a desired orientation of the assembly 10 and then attach it to the display area 100 with this orientation in a single manufacturing step.

It should also be noted that, according to the further embodiments explained in the general description part, it may also be provided that the cover layer 12 is removable from the assembly 10, preferably manually removable and further preferably manually peelable. Then, the cover layer 12 is preferably formed as a film and a material is filled in the space Z. This material can provide an adhesive effect to make the cover layer 12 adhere to the assembly 10. To ensure reliable manual removal, this effect can be deliberately reduced by applying a release agent between the material and the film. When the cover layer film 12 is removed, this release agent can remain at least partially on the film, so that secure adhesion of the assembly 10 with the then exposed side or the exposed material in the space Z to the display area 100 is ensured.

It is understood that the cover layer film 12 is preferably only removed if the then exposed side or the material there is to be attached to the display area 100. On the other hand, the cover layer film 12 preferably remains on the assembly 10 if this is not the case or if the carrier layer 16 is to be bonded to the display area 100.

Exemplary method sequences according to aspects of the invention are explained below in FIG. 3 and FIG. 4.

Figure 3:
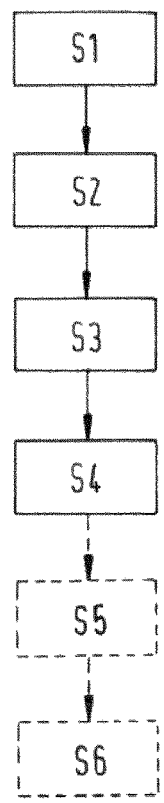
FIG. 3 shows a flowchart of a method according to the invention for producing the lenticular lens assembly of, for example, FIG. 1.

FIG. 3 shows a method sequence for producing the assembly 10 of FIG. 1. In a step S1, the layers 12, 14, 16 are initially produced and/or provided in a separate form.

In a step S2, the carrier layer 16 is attached to the second surface 18 of the lens layer 14 and is preferably bonded thereto over its entire surface.

In a step S3, which in principle could also take place before step S2, the cover layer 12 is connected to the first surface 20 of the lens layer 14 via an optional adhesive layer in the space Z of FIG. 1. Alternatively, the layers 12, 14 (optionally also with the cover layer 16) are connected via the edge bonding 24 discussed above. Further alternatively, the cover layer 12 (in particular a cover layer film) is connected to a material located in the space Z by adhesion.

In a step S4, the assembly 10 is completed, i.e. prefabricated, by the fixed and preferably permanent connection of the layers 12, 14, 16 in the preceding steps S1-S3. The fixed and permanent connection also includes variants in which the cover layer 12 can be removed manually, but the assembly 10 in itself consists of layers 12, 14, 16 secured to one another and can also be transported in this form, for example. In this prefabricated state, the assembly 10 can be transported onwards, for example, to a finishing production line of a display device and/or display areas 100.

An alternative method sequence, which additionally comprises the dashed steps S5 and S6 shown in FIG. 3, as well as alternative procedures in steps S1-S4, is as follows: In step S1, a concave mould and, more specifically, a negative of the lens layer 14 and in particular of the first surface 20 (i.e. the lens portions 22) is filled with liquid plastic. Preferably, a liquid polymer (for example acrylic) is used.

In step S2, the carrier layer 16 is placed on the mould from step S1 and aligned, wherein the mould still contains the liquid polymer. The side of the carrier layer 16 with which it is placed on the mould preferably has a preparation or pre-treatment to improve adhesion to or with the polymer. For example, it can have or can be treated with a so-called primer.

In step S3, the liquid polymer is cured, for example by irradiation with UV light. This causes it to be fixedly connected to the carrier layer 16.

In a step S4, silicone is applied from the outside to the first surface 20 of the lens layer 14 (in particular after removing the negative mould). The curved lens portions 22 and more precisely the free spaces between them are consequently filled with silicone.

In a step S5, the cover layer 12 is placed and aligned on the lens layer 14 and the silicone applied thereto.

In a step S6, the silicone is cured and thus the cover layer 12 and the lens layer 14 are bonded together. However, this is not mandatory. Instead, the silicone may not be fully cured and/or a release agent may be applied between the silicone and the cover layer 12 to allow the cover layer 12 to be manually removed in the manner described herein.

Figure 4:
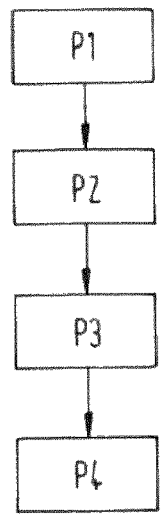
FIG. 4 shows a flow chart of a method according to a further aspect of the invention.

A possible production sequence in such a finishing production line is shown in FIG. 4. In a step P1, the assembly 10 is provided as a prefabricated module.

In a step P2, the assembly 10 is aligned according to a desired orientation. This is done in such a way that either the cover layer 12 (or a side from which the cover layer 12 has been removed as an upstream action) or the carrier layer 16 faces the display area 100. Criteria for the choice of orientation have been mentioned above (for example pixel density of the display area 100, required smoothing effects, etc.).

In a step P3, the assembly 10 is then connected to the display area 100 with the correspondingly defined orientation and preferably bonded thereto over the entire surface. In the case of a removed cover layer 12, the connection can be achieved by adhesion and preferably without an additional adhesive layer.

In a step P4, the appropriately coated display area 100 is completed and, if not already done, can then be installed in, or connected to a display device. The display device can, for example, have the necessary power supply for the display area 100 and/or the control units required for this (for example, a computer device for controlling the display area 100 for the purpose of presenting desired content).

The phrase "at least one of A, B, and C" should be construed to mean a logical (A OR B OR C), using a non-exclusive logical OR, and should not be construed to mean "at least one of A, at least one of B, and at least one of C."

The invention claimed is:

1. A method of producing a lenticular lens assembly, the method comprising:
   providing a lenticular lens layer including:
      a first surface including a plurality of curved lens portions, and
      a second surface facing away from the first surface;
   connecting a carrier layer to the lenticular lens assembly, wherein the carrier layer faces a second surface of the lenticular lens layer at least in some regions;
   arranging a filler material on the first surface of the lenticular lens assembly;
   connecting a cover layer to the lenticular lens assembly, wherein the cover layer faces the first surface of the lenticular lens layer at least in some regions,
   wherein the filler material is arranged between the lenticular lens layer and the cover layer,
   wherein the cover layer is configured to be removed before attachment of the lenticular lens assembly to a display area,
   wherein the cover layer is arranged, prior to removal, at a distance from the plurality of curved lens portions, and
   wherein the filler material is configured to, upon removal of the cover layer and attachment of the lenticular lens assembly to the display area, provide an adhesive effect of the lenticular lens assembly to the display area;
   producing a plurality of lenticular lens assemblies including the lenticular lens assembly;
   attaching a first assembly of the plurality of lenticular lens assemblies to a first display area such that a side of the first assembly from which the cover layer has been removed faces the display area; and
   attaching a second assembly of the plurality of lenticular lens assemblies to a second display area such that the carrier layer of the second assembly faces the display area.

2. The method of claim 1 further comprising:
   removing the cover layer from the lenticular lens assembly; and
   attaching the lenticular lens assembly to the display area subsequent to removing the cover layer,
   wherein attaching the lenticular lens assembly to the display area includes attaching the filler material to the display area, and
   wherein the filler material provides an adhesive effect of the lenticular lens assembly to the display area.

3. The method of claim 1 wherein all of the plurality of lenticular lens assemblies are structurally identical.

4. A method of producing a lenticular lens assembly, the method comprising:
   providing a lenticular lens layer including:
      a first surface including a plurality of curved lens portions, and
      a second surface facing away from the first surface;
   connecting a carrier layer to the lenticular lens assembly, wherein the carrier layer faces a second surface of the lenticular lens layer at least in some regions;
   arranging a filler material on the first surface of the lenticular lens assembly;
   connecting a cover layer to the lenticular lens assembly, wherein the cover layer faces the first surface of the lenticular lens layer at least in some regions,
   wherein the filler material is arranged between the lenticular lens layer and the cover layer,
   wherein the cover layer is configured to be removed before attachment of the lenticular lens assembly to a display area, and
   wherein the filler material is configured to, upon removal of the cover layer and attachment of the lenticular lens assembly to the display area, provide an adhesive effect of the lenticular lens assembly to the display area;
   producing a plurality of lenticular lens assemblies, including the lenticular lens assembly;
   attaching a first assembly of the plurality of lenticular lens assemblies to a first display area such that a side of the first assembly from which the cover layer has been removed faces the display area; and
   attaching a second assembly of the plurality of lenticular lens assemblies to a second display area such that the carrier layer of the second assembly faces the display area.

5. The method of claim 4 wherein all of the plurality of lenticular lens assemblies are structurally identical.

\* \* \* \* \*